United States Patent
Stelzer et al.

(10) Patent No.: US 12,503,268 B2
(45) Date of Patent: Dec. 23, 2025

(54) CONTAINER BASE WITH DEEP INSET RECESSES

(71) Applicant: AMCOR RIGID PACKAGING USA, LLC, Ann Arbor, MI (US)

(72) Inventors: James Stelzer, South Lyon, MI (US); Bradley S. Philip, Tecumseh, MI (US); Michael T. Lane, Brooklyn, MI (US)

(73) Assignee: AMCOR RIGID PACKAGING USA, LLC, Manchester, MI (US)

( * ) Notice: Subject to any disclaimer, the term of this patent is extended or adjusted under 35 U.S.C. 154(b) by 52 days.

(21) Appl. No.: 18/039,995

(22) PCT Filed: Dec. 10, 2020

(86) PCT No.: PCT/US2020/064269
§ 371 (c)(1),
(2) Date: Jun. 2, 2023

(87) PCT Pub. No.: WO2022/125098
PCT Pub. Date: Jun. 16, 2022

(65) Prior Publication Data
US 2024/0101299 A1    Mar. 28, 2024

(51) Int. Cl.
B65D 1/02 (2006.01)
B29C 49/12 (2006.01)
B29C 49/48 (2006.01)

(52) U.S. Cl.
CPC ......... B65D 1/0276 (2013.01); B65D 1/0284 (2013.01)

(58) Field of Classification Search
CPC .............. B65D 1/0276; B65D 1/0284

USPC ............................................ 220/608; D9/520
See application file for complete search history.

(56) References Cited

U.S. PATENT DOCUMENTS

| | | | | |
|---|---|---|---|---|
| 3,468,443 A | * | 9/1969 | Paul | B65D 1/0284 220/606 |
| 4,054,219 A | * | 10/1977 | Young | B65D 1/0284 220/608 |
| 4,108,324 A | * | 8/1978 | Krishnakumar | B65D 1/0276 215/373 |
| 4,177,239 A | * | 12/1979 | Gittner | B29C 49/08 264/529 |
| 5,005,716 A | * | 4/1991 | Eberle | B65D 1/0276 215/373 |

(Continued)

FOREIGN PATENT DOCUMENTS

| | | |
|---|---|---|
| CO | 98002868 A | 1/1998 |
| EP | 0348147 A2 | 12/1989 |

(Continued)

OTHER PUBLICATIONS

International Search Report and Written Opinion of the ISA issued in PCT/US2020/064269, mailed Aug. 26, 2021, ISA/KR.

(Continued)

*Primary Examiner* — Gideon R Weinerth
(74) *Attorney, Agent, or Firm* — Harness, Dickey & Pierce, P.L.C.

(57) ABSTRACT

A polymeric container including a finish defining an opening of the container. A body defines an internal volume for storing product therein. A base is at an end of the body opposite to the finish. The base defines a plurality of recesses spaced apart from one another about an axial center of the base.

14 Claims, 8 Drawing Sheets

(56) References Cited

U.S. PATENT DOCUMENTS

| | | | | |
|---|---|---|---|---|
| 5,205,434 A * | 4/1993 | Brunson | B65D 1/0284 | 220/608 |
| 5,236,097 A * | 8/1993 | Behm | B65D 1/0276 | 215/373 |
| 5,255,889 A * | 10/1993 | Collette | B29C 33/306 | 249/102 |
| 5,503,283 A * | 4/1996 | Semersky | B65D 1/0276 | 220/608 |
| 5,597,089 A | 1/1997 | Smith | | |
| 5,763,030 A * | 6/1998 | Matsui | B29C 49/541 | 215/374 |
| 6,277,321 B1 * | 8/2001 | Vailliencourt | B65D 1/02 | 264/529 |
| 7,900,425 B2 * | 3/2011 | Bysick | B65D 1/0276 | 215/381 |
| 8,323,555 B2 * | 12/2012 | Trude | B29C 49/4802 | 425/522 |
| 8,524,349 B2 * | 9/2013 | Protais | B65D 1/0284 | 215/373 |
| 9,193,495 B2 * | 11/2015 | Eble | B65D 1/0261 | |
| 9,394,072 B2 * | 7/2016 | Patcheak | B65D 79/0081 | |
| 9,522,508 B2 * | 12/2016 | Wilson | B29C 49/42808 | |
| 9,598,201 B2 * | 3/2017 | Boukobza | B65D 1/0276 | |
| 9,688,013 B2 * | 6/2017 | Derrien | B29C 49/541 | |
| 9,744,712 B2 * | 8/2017 | Letestu | B29C 49/78 | |
| 9,969,118 B2 * | 5/2018 | Derrien | B29C 49/70 | |
| 10,518,924 B2 * | 12/2019 | Woloszyk | B65D 79/0081 | |
| 10,611,544 B2 * | 4/2020 | Melrose | B65D 1/0284 | |
| 11,345,504 B2 * | 5/2022 | Pedmo | B65D 1/0276 | |
| 11,919,670 B2 * | 3/2024 | Stelzer | B29C 49/4802 | |
| 2006/0231985 A1 * | 10/2006 | Kelley | B29C 49/482 | 425/522 |
| 2009/0159556 A1 | 6/2009 | Patcheak et al. | | |
| 2009/0202766 A1 * | 8/2009 | Beuerle | B29C 49/4815 | 264/572 |
| 2012/0031916 A1 * | 2/2012 | Derrien | B29C 49/48 | 220/675 |
| 2013/0001235 A1 * | 1/2013 | Patcheak | B65D 79/0081 | 215/373 |
| 2014/0312538 A1 * | 10/2014 | Wilson | B29C 49/18 | 425/522 |
| 2015/0136725 A1 * | 5/2015 | Boukobza | B65D 1/0276 | 215/373 |
| 2015/0375442 A1 * | 12/2015 | Penet | B29C 49/48 | 425/522 |
| 2016/0152457 A1 * | 6/2016 | Godet | G01L 3/108 | 53/471 |
| 2017/0267392 A1 * | 9/2017 | Woloszyk | B65D 1/0276 | |
| 2020/0230861 A1 * | 7/2020 | Oike | B29C 49/18 | |
| 2021/0221593 A1 * | 7/2021 | Lane | B65D 1/0276 | |
| 2022/0089310 A1 * | 3/2022 | Stelzer | B29C 49/4273 | |
| 2023/0166882 A1 * | 6/2023 | Bhat | B65D 1/0276 | 215/373 |
| 2023/0249888 A1 * | 8/2023 | Sugizaki | B65D 79/0081 | 215/373 |
| 2024/0101299 A1 * | 3/2024 | Stelzer | B65D 1/0284 | |
| 2025/0042596 A1 * | 2/2025 | Bruinooge | B65D 1/0246 | |

FOREIGN PATENT DOCUMENTS

| | | |
|---|---|---|
| EP | 3348375 A1 | 7/2018 |
| EP | 3154864 B1 | 2/2020 |
| JP | H05254531 A | 10/1993 |
| JP | H07112729 A | 5/1995 |
| JP | 2011218722 A | 11/2011 |
| WO | WO-9615035 A1 | 5/1996 |
| WO | WO-2015189127 A1 | 12/2015 |

OTHER PUBLICATIONS

Extended European Search Report from counterpart EP209652791, dated Jul. 15, 2024.

Colombia Office Action from counterpart Co NC2023/0007514, dated Nov. 8, 2024.

* cited by examiner

CONTAINER BASE WITH DEEP INSET RECESSES

CROSS-REFERENCE TO RELATED APPLICATIONS

This application is a U.S. National Phase Patent Application under 35 U.S.C. 371 of International Application No. PCT/US2020/064269 (filed on Dec. 10, 2020), the entire disclosure of which is incorporated herein by reference.

FIELD

The present disclosure relates to a container base including deep inset recesses.

BACKGROUND

This section provides background information related to the present disclosure, which is not necessarily prior art.

As a result of environmental and other concerns, plastic containers, more specifically polyester, and even more specifically polyethylene terephthalate (PET) containers, are being used more than ever to package numerous commodities previously supplied in glass containers. Manufacturers and fillers, as well as consumers, have recognized that PET containers are lightweight, inexpensive, recyclable, and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall. These containers are suitable for ambient or cold-filling applications.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%. These containers are suitable for hot-filled containers and higher temperature processing.

While current polymeric containers are suitable for their intended use, they are subject to improvement. For example, some heavyweight containers/bases may experience a base roll-out condition and/or base sag in response to an increase in pressure within the container. The present disclosure advantageously includes an improved container with a base that is less likely to experience base roll-out and base sag. A mold assembly for forming the container is also included. One skilled in the art will appreciate that the present disclosure provides numerous additional advantages and unexpected results as well.

SUMMARY

This section provides a general summary of the disclosure, and is not a comprehensive disclosure of its full scope or all of its features.

The present disclosure includes a polymeric container having a finish defining an opening of the container. A body defines an internal volume for storing product therein. A base is at an end of the body opposite to the finish. The base defines a plurality of recesses spaced apart from one another about an axial center of the base.

The present disclosure further includes a mold assembly for forming a polymeric container having a base defining a plurality of recesses spaced apart from one another about an axial center of the base. The mold assembly has a mold base for forming the base of the container. A plurality of protrusions are spaced apart about an axial center of the mold base and movable between a retracted position and an extended position. In the extended position, the plurality of protrusions stretch the base to define the plurality of recesses.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
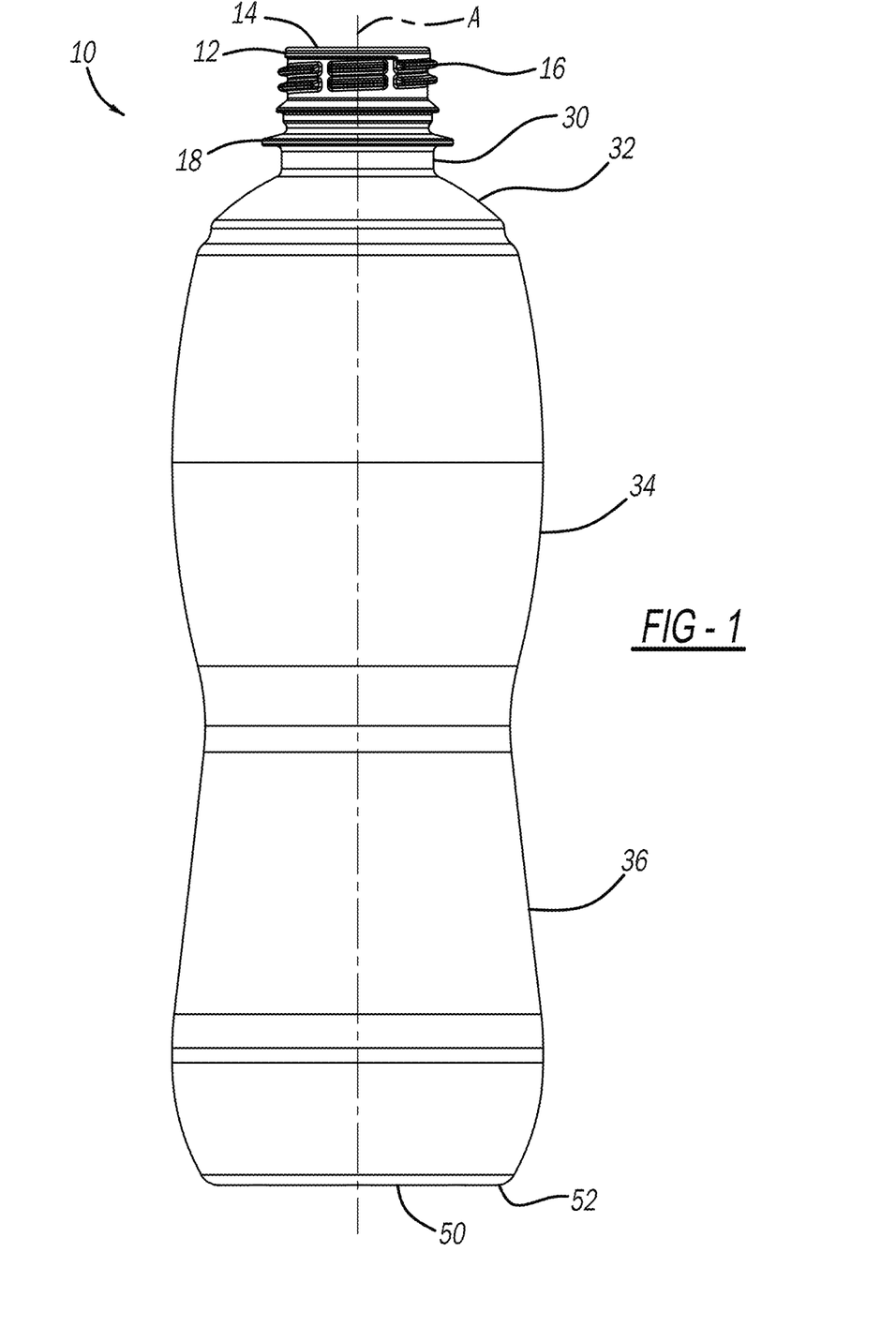
FIG. 1 is a side view of a container in accordance with the present disclosure.

FIG. 1 illustrates an exemplary polymeric container in accordance with the present disclosure at reference numeral 10. The container 10 may be made of any suitable material, such as any suitable polymeric material. Suitable polymeric materials include, but are not limited to, the following: polyethylene terephthalate (PET), low-density polyethylene (LDPE), high-density polyethylene (HDPE), polypropylene (PP), polystyrene, and the like, for example. The container 10 may be configured for storing any suitable products, such as, but not limited to, the following: water; carbonated soft drinks (CSD); spirits and other alcoholic beverages; sports beverages; energy beverages; juice, pharmaceuticals, cleaning solutions, oils, detergents, chemicals, etc. The container 10 may be configured as a pasteurized container configured to withstand increased time, temperature, and pressure processing conditions. The container 10 is advantageously able to withstand multiple refilling cycles because the container 10 has reduced stress cracking. Additional advantages of the container 10 are described in detail herein.

The container 10 includes a finish 12, which defines an opening 14 of the container 10. At an outer surface of the finish 12 are threads 16, which are configured to secure any suitable closure to the finish 12 and over the opening 14. Below the threads 16 is a flange 18, which extends outward and around the finish 12. The flange 18 is suitable for supporting a preform during blow molding of the container 10 from the preform.

On a side of the flange 18 opposite to the opening 14 is a neck 30. The neck 30 extends to a shoulder 32 of the container 10. The shoulder 32 transitions to a body 34 of the container 10. The body 34 includes a sidewall 36, which defines an interior volume of the container 10 in which any suitable product may be stored. At an end of the body 34 opposite to the shoulder 32 is a base 50.

The base 50 includes a standing ring 52, which is configured to support the container 10 upright on a flat, or a generally flat, surface. A longitudinal axis A of the container 10 extends through an axial center of the container 10. Specifically, the longitudinal axis A extends through an axial center of the finish 12, the opening 14, the neck 30, the shoulder 32, the body 34, the base 50, and the standing ring 52.

Figure 2:
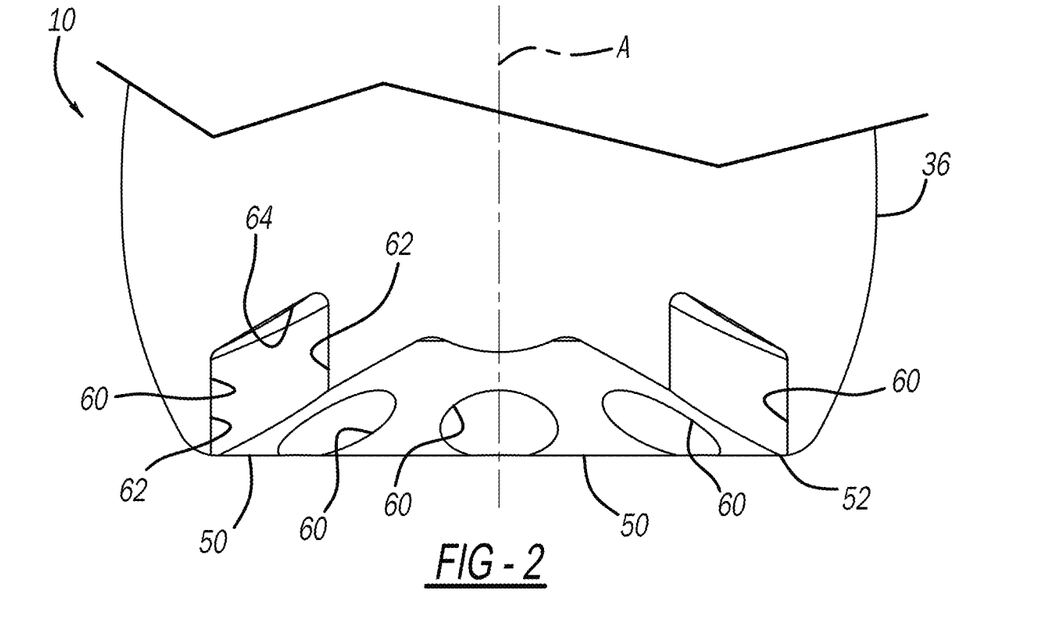
FIG. 2 is a cross-sectional view of a base of the container of FIG. 1.
Figure 3:
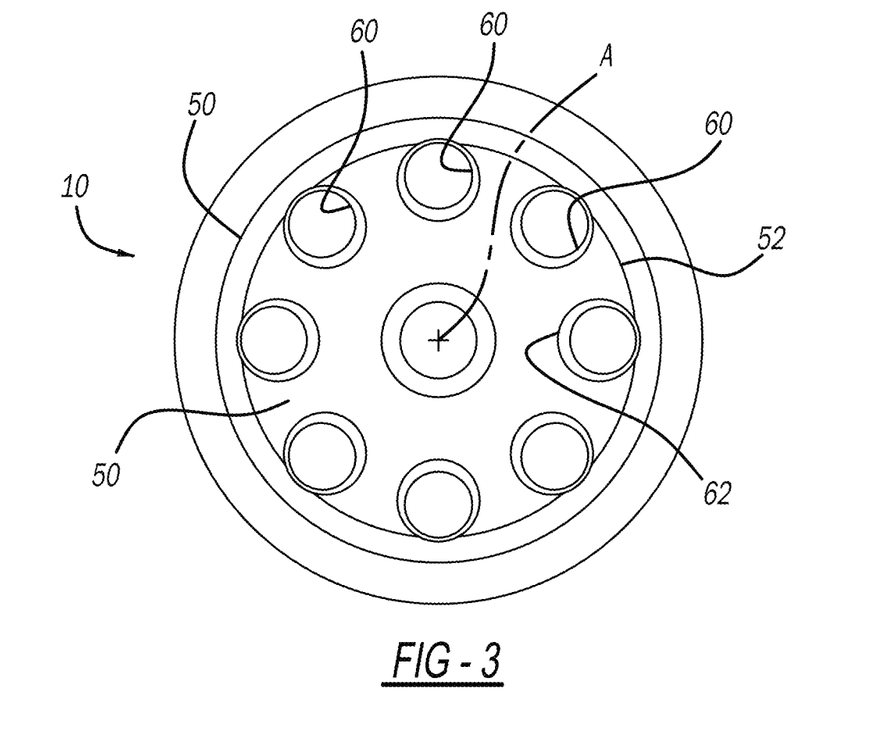
FIG. 3 is a plan view of the base of the container of FIG. 1.
Figure 4:
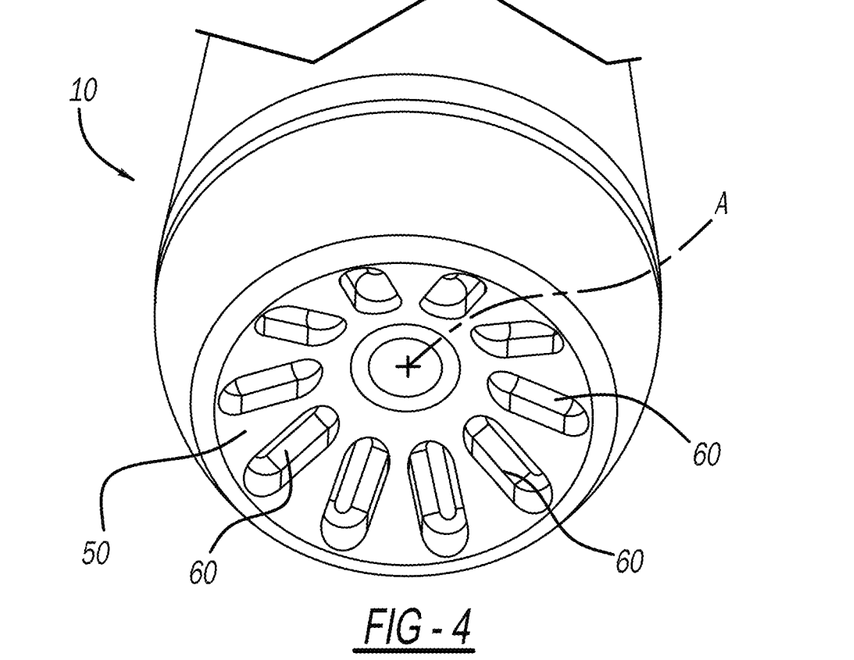
FIG. 4 is a perspective view of another container base in accordance with the present disclosure.
Figure 5:
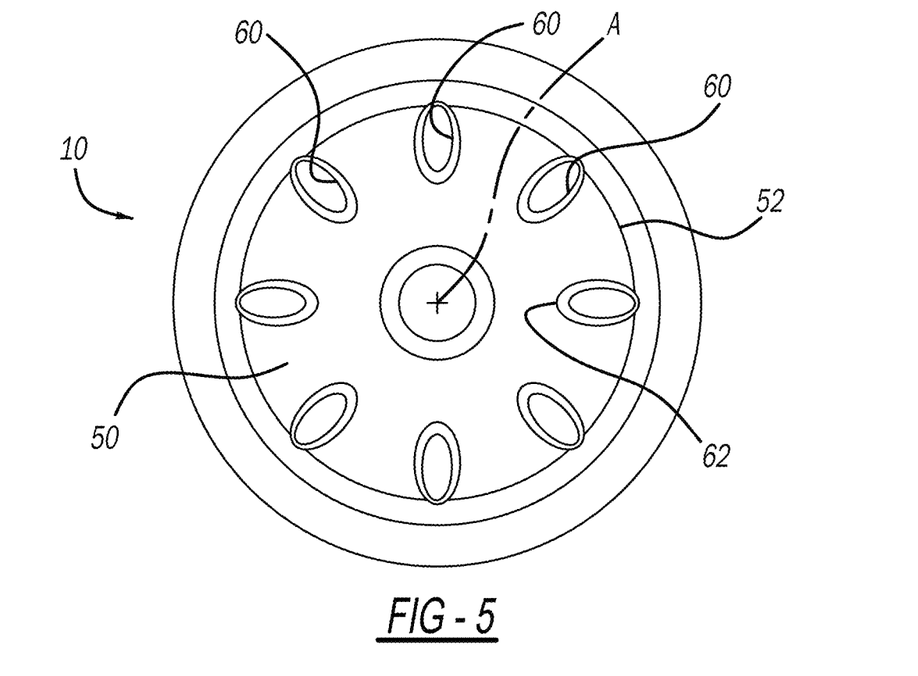
FIG. 5 is a plan view of an additional container base in accordance with the present disclosure.
Figure 6:
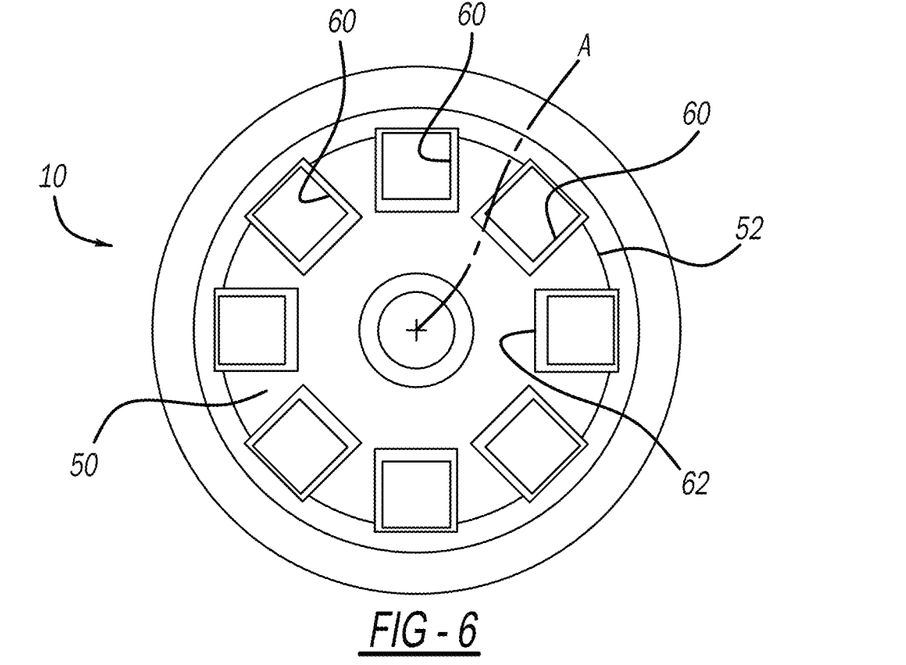
FIG. 6 is a plan view of another container base in accordance with the present disclosure.
Figure 7:
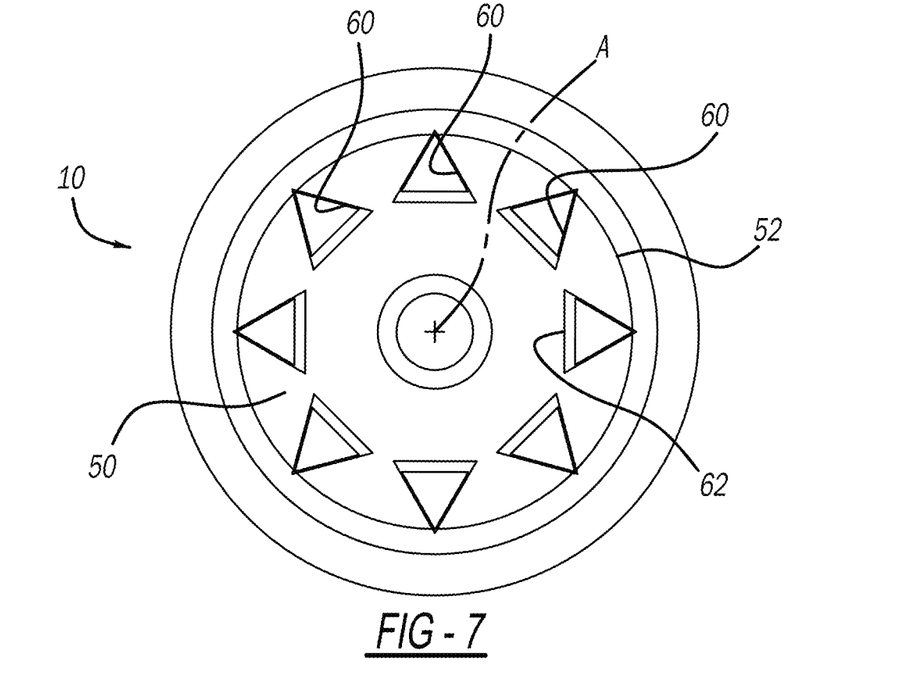
FIG. 7 is a plan view of yet another container base in accordance with the present disclosure.
Figure 8:
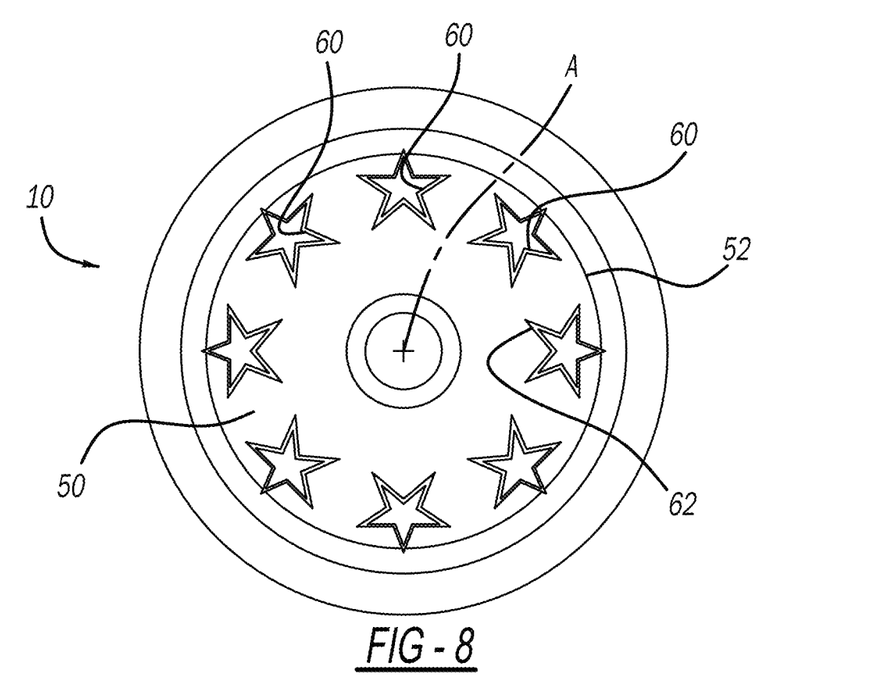
FIG. 8 is a plan view of still another container base in accordance with the present disclosure.

With continued reference to FIG. 1, and additional reference to FIGS. 2 and 3, the base 50 will now be described in additional detail. The base 50 defines a plurality of recesses 60 spaced apart from one another about an axial center of the base 50 through which the longitudinal axis A extends. The plurality of recesses 60 extend inward towards the finish 12. Each one of the plurality of recesses 60 includes a sidewall 62 and an inner or end surface 64. The plurality of recesses 60 may have any suitable size and shape, such as round, as illustrated in FIGS. 2 and 3. The plurality of recesses 60 may have any other suitable shape as well. For example, the plurality of recesses 60 may be rectangular or pill-shaped (FIG. 4), oval (FIG. 5); square (FIG. 6); triangular (FIG. 7); or star-shaped (FIG. 8).

Figure 9:
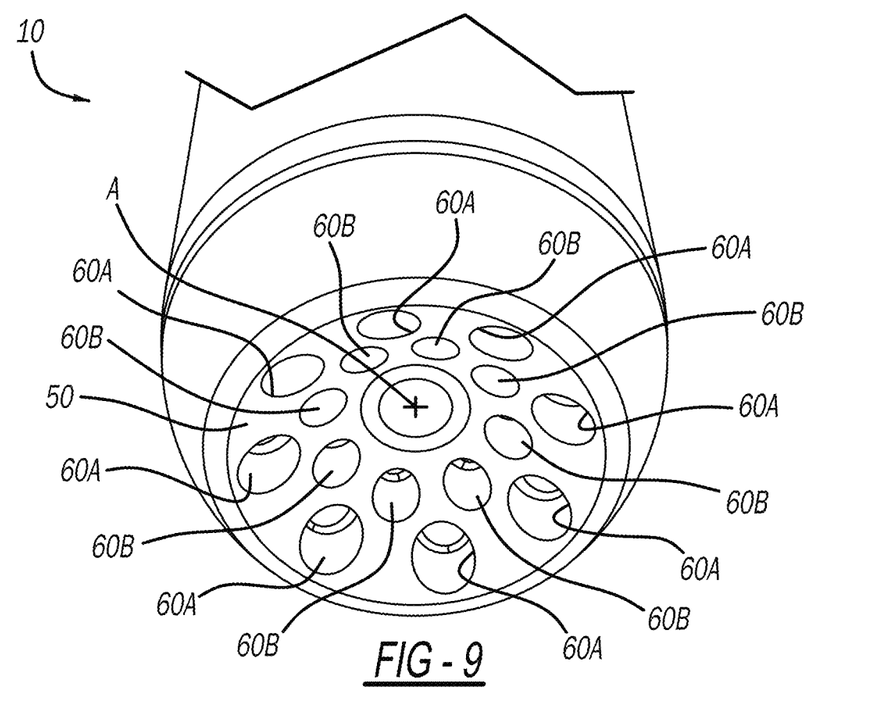
FIG. 9 is perspective view of an additional container base in accordance with the present disclosure

The plurality of recesses 60 may be arranged in only a single group such that all of the plurality of recesses 60 are equidistant from one another, and all of the plurality of recesses 60 are equidistant from the axial center of the base 50 through which the longitudinal axis A extends, as illustrated in FIGS. 3-8 for example. Alternatively and as illustrated in FIG. 9, the plurality of recesses 60 may be arranged in an outer group 60A and an inner group 60B. The plurality of recesses of the outer group 60A are further from the axial center of the base 50 as compared to the plurality of recesses of the inner group 60B. All of the plurality of recesses of the outer group 60A are equidistant from one another, and all of the plurality of recesses of the outer group 60A are equidistant from the axial center of the base 50 through which the longitudinal axis A extends. All of the plurality of recesses of the inner group 60B are equidistant from one another, and all of the plurality of recesses of the inner group 60B are equidistant from the axial center of the base 50 through which the longitudinal axis A extends. In other applications, the recesses 60 can be arranged in non-equidistant and non-symmetric patterns.

Figure 10:
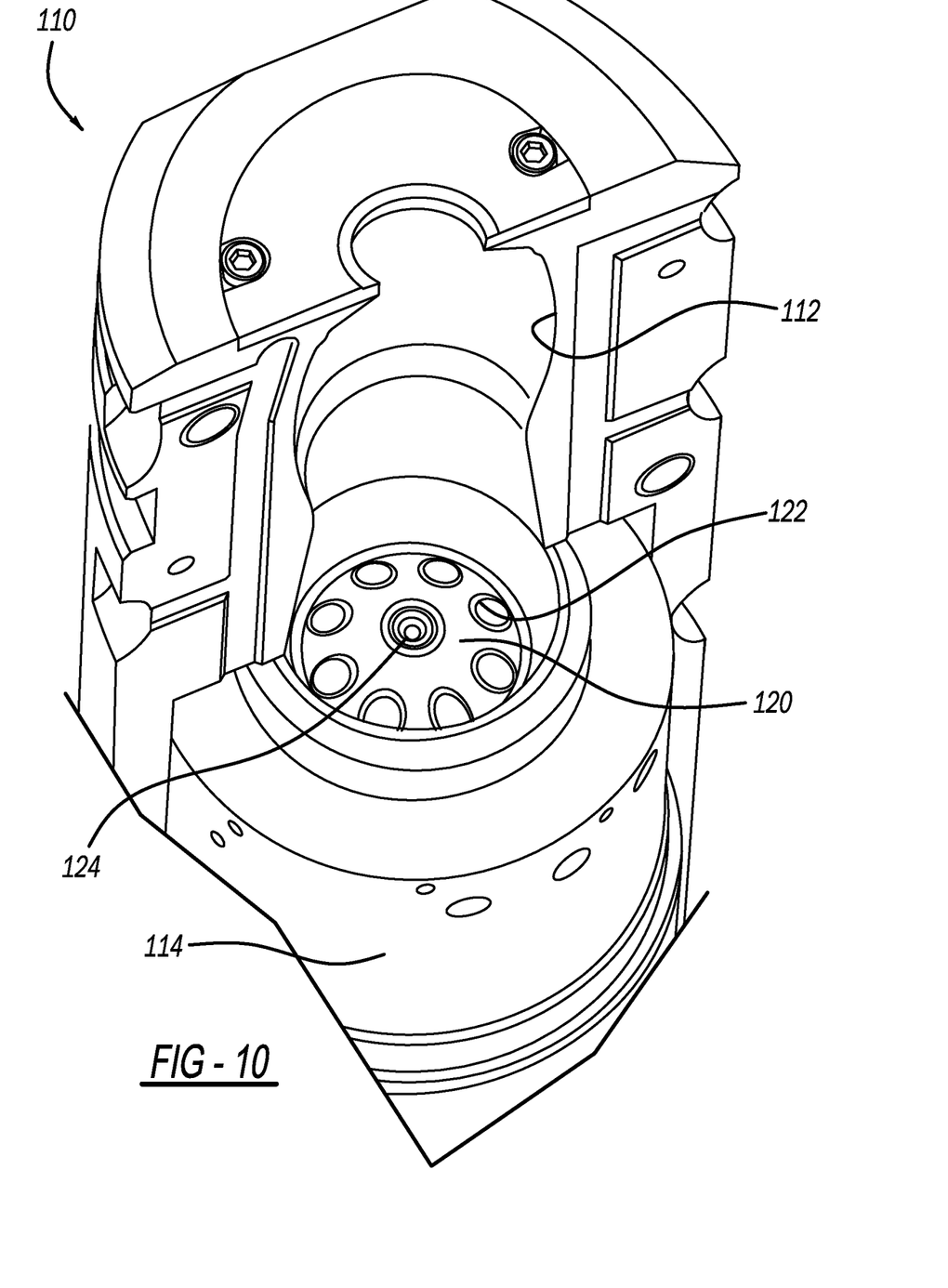
FIG. 10 is a perspective view of a mold assembly for forming the container of FIG. 1.

FIG. 10 illustrates an exemplary mold assembly 110 for forming the container 10 from any suitable preform, such as by blow-molding. The mold assembly 10 generally includes a body mold 112 supported by a pedestal 114. A base mold 120 is also supported by the pedestal 114. The body mold 112 forms the body 34 of the container 10, and the base mold 120 forms the base 50 of the container 10.

The base mold 120 defines a plurality of outer apertures 122, which are spaced apart about a center aperture 124. With additional reference to FIGS. 11 and 12, a counter-stretch rod 126 is aligned with the center aperture 124 and movable during the blow molding process between an extended position (FIG. 11) in which the counter-stretch rod 126 extends out from within the center aperture 124, and a retracted position (FIG. 12) in which the counter-stretch rod 126 does not extend from the center aperture 124. A plurality of protrusions 130 are aligned with the outer apertures 122. The plurality of protrusions 130 are movable between retracted positions (FIG. 11) in which the protrusions 130 do not extend from the outer apertures 122, and extended positions (FIG. 12) in which the protrusions 130 extend out from within the outer apertures 122.

Figure 11:
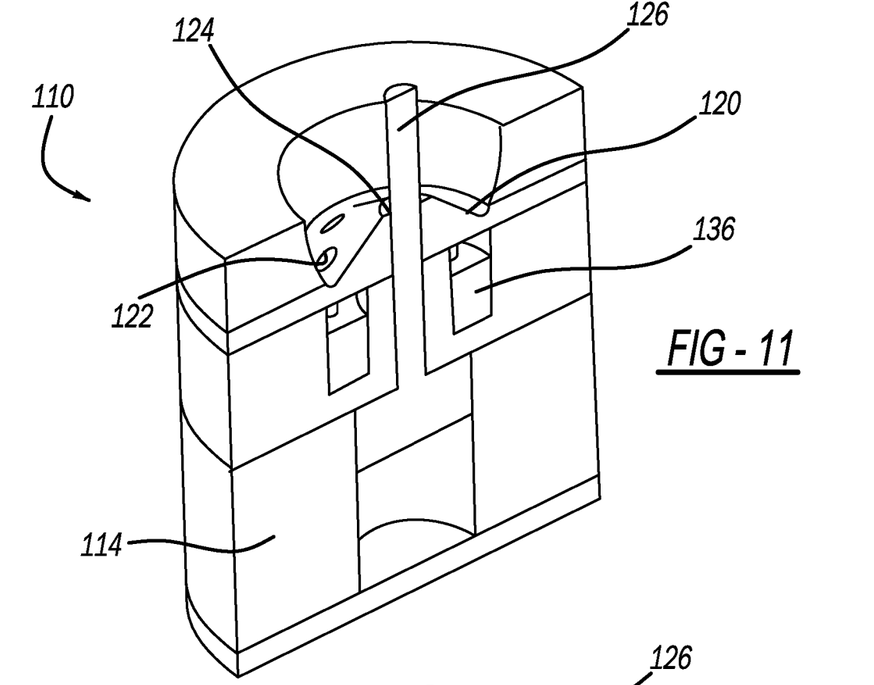
FIG. 11 is a cross-sectional view of a two-piece base assembly for the mold assembly of FIG. 10 showing base protrusions in a retracted position.
Figure 12:
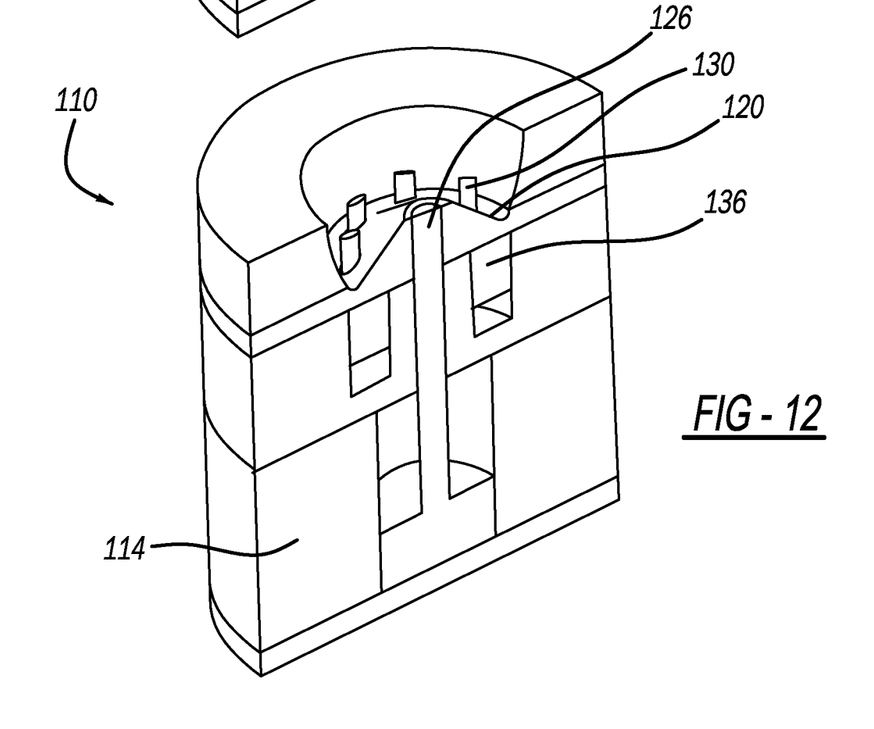
FIG. 12 is a cross-sectional view of the two-piece base assembly of FIG. 11 showing the base protrusions in an extended position.
Figure 13:
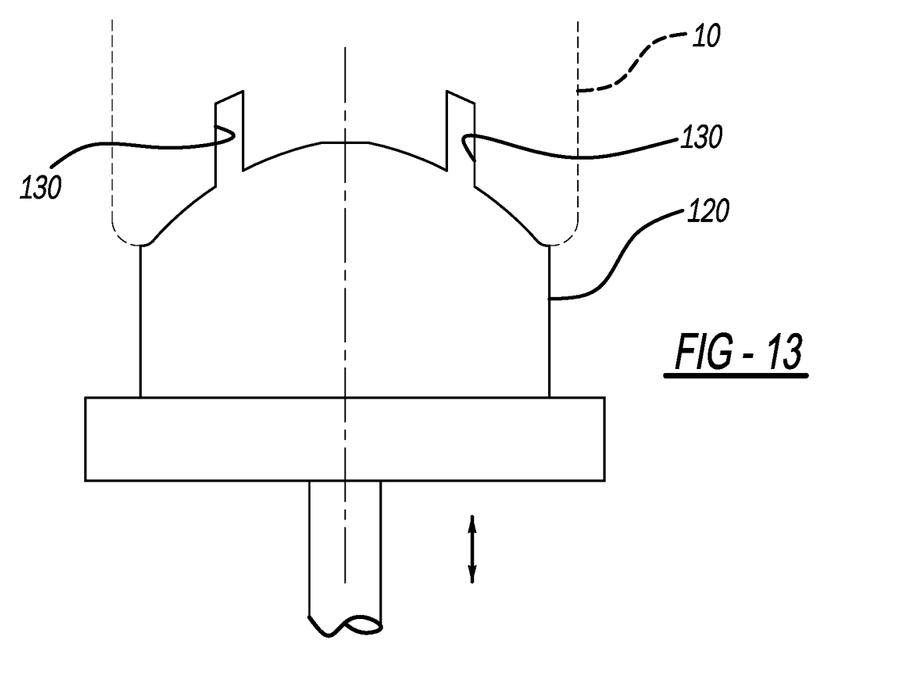
FIG. 13 is a cross-sectional view of a one-piece base assembly for the mold assembly of FIG. 10.

The plurality of protrusions 130 may be mounted to a protrusion base 136, as illustrated in FIGS. 11 and 12. The protrusion base 136 moves vertically to arrange the plurality of protrusions 130 in the retracted positions of FIG. 11 or the extended positions of FIG. 12. Alternatively and as illustrated in FIG. 13, the plurality of protrusions 130 may be integral with base mold 120, and thus may be movable with the base mold 120.

The size and shape of the plurality of protrusions 130 corresponds to the size and shape of the plurality of recesses 60 of the base 50. Thus, round protrusions 130 are used to form the plurality of recesses 60 as round recesses. To form the plurality of recesses 60 as oval, rectangular, star shaped etc., the plurality of protrusions 130 will be oval, rectangular, star shaped, etc.

Figure 14:
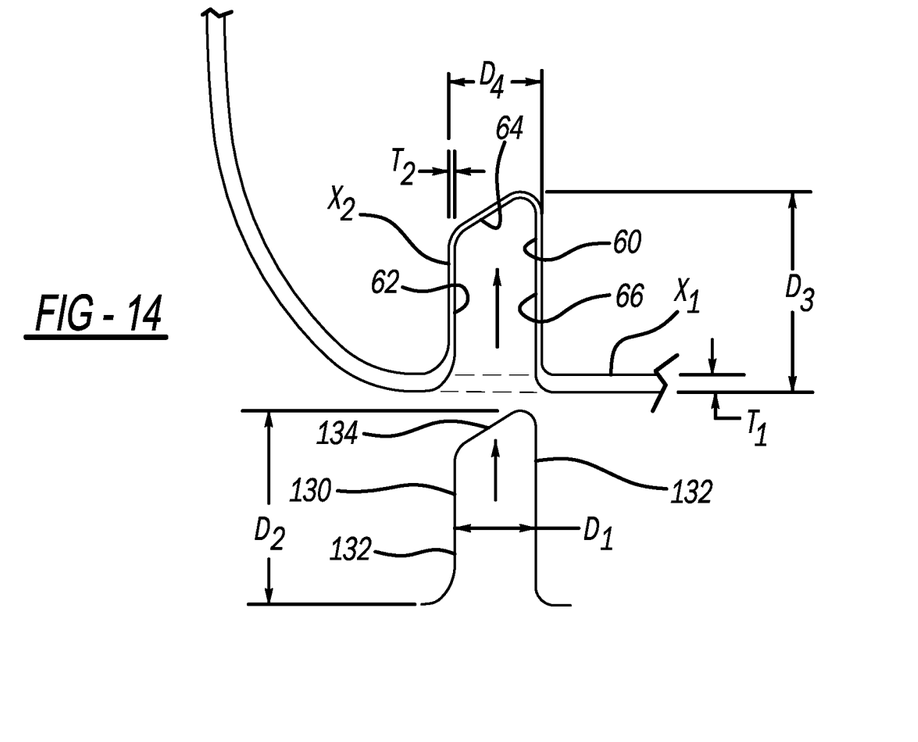
FIG. 14 is a cross-sectional view of the base of FIG. 1 identifying various dimensions thereof.

As illustrated in FIG. 14, each one of the plurality of protrusions 130 has a side portion 132 and an end portion 134. The side portion 132 has one or more lengths corresponding to the sidewalls 60, 62 of the plurality of recesses 60. The sidewalls 60 and 62 can be straight as shown in FIG. 14, or the sidewalls 60 and 62 can be angled with a positive or negative draft angle. The end portion 134 of the plurality of protrusions 130 has a shape corresponding to the end 64 of the plurality of recesses 60. In the example of FIG. 14, both the end 134 of the plurality of protrusions 130 and the end 64 of the plurality of recesses 60 is angled in a cross-section such that the plurality of recesses 60 are deepest proximate to the axial center of the base 50.

Each one of the plurality of protrusions 130 has a maximum cross-sectional width corresponding to dimension $D_1$ of FIG. 14. The dimension $D_1$ is equal to, or generally equal to, a maximum width dimension $D_4$ of each one of the plurality of recesses 60. Each one of the plurality of protrusions 130 has a maximum height $D_2$, which is equal to, or generally equal to, a maximum depth $D_3$ of the plurality of recesses 60. In the examples illustrated, each one of the plurality of recesses 60 has a depth dimension $D_3$ that is greater than a width dimension $D_4$.

Between the plurality of recesses 60, the base 50 has a thickness $T_1$. At each one of the plurality of recesses 60, the base 50 has a thickness $T_2$, which is less than the thickness $T_1$. The cross-sectional dimension $D_1$ of the plurality of protrusions 130 combined with the height (or depth) $D_2$ of the protrusions 130 is sized to provide a desired wall thickness $T_2$ of the recesses 60.

The recesses 60 can be identical or each recess 60 can have a different height D2, cross-section D1, or shape. Between the plurality of recesses 60, the base 50 has a crystallinity $X_1$, which is less than a crystallinity $X_2$ at each one of the plurality of recesses 60. The combination of increased crystallinity and the plurality of recesses 60 advantageously increases the overall strength of the base 50, which makes the base 50 further resistant to any potential deformation under internal pressure and external top load forces.

The base 50 may have any suitable dimensions, such as the following exemplary dimensions:

|  |  | Low | High | Nominal |
|---|---|---|---|---|
| Thickness | T1 | 0.0635 mm | 1.143 mm | 0.889 mm |
| Thickness | T2 | 0.254 mm | 0.508 mm | 0.381 mm |
| Diameter | D1 | 3.81 mm | 8.89 mm | 6.35 mm |
| Distance | D2 | 5.08 mm | 15.24 mm | 10.16 mm |

During the molding process for forming the container 10, the counter-stretch rod 126 is typically first arranged in the extended position of FIG. 11, and the blow-molding process is initiated to stretch the preform towards the counter-stretch rod 126 such that the preform abuts or nearly abuts the counter-stretch rod 126. The counter-stretch rod 126 is then moved to the retracted position of FIG. 12, which allows the preform to stretch further and contact the base mold 120. The preform material is stretched over the base mold 120 to form the standing ring 52 and a heel of the container 10. The preform material stretches over the apertures 122 of the base mold 120, and then the plurality of protrusions 130 are moved from the retracted position to the extended position of FIGS. 12 and 13. The plurality of protrusions 130 stretch the base 50 inward to form the plurality of recesses 60. The plurality of protrusions 130 advantageously eliminate any need for over-stroke. The plurality of protrusions 130 advantageously localize orientation of the PET material to increase structure and thermal resistance of the base 50.

The present disclosure thus advantageously provides for an improved container 10 having a base 50 that reduces base roll-out and/or sag, which may be caused by increased weight and pressure within the container 10. The plurality of recesses 60 increase rigidity of the base 50, and increase localized stretch induced crystallinity of the material of the base 50, such as PET material. Material weight of the base 50 may also be reduced because the base 50 is provided with increased strength.

The present disclosure is applicable to the container 10, as well as any other suitable containers. For example, the present disclosure also applies to carbonated soft drink containers with "champagne" style bases. In accordance with the present disclosure, such champagne-style bases may be formed with less material at the base, while still meeting performance specifications.

The present disclosure also applies to pasteurized containers, which when formed to include the plurality of recesses 60 will be able to withstand increased time, temperature, and pressure processing conditions. The present disclosure further applies to refillable PET containers, which when formed in accordance with the present disclosure will have reduced stress cracking at the base 50, and therefore be able to withstand additional refilling cycles. The present disclosure still further applies to spirits containers, which when formed in accordance with the present disclosure will have enhanced base stability and base clearance without any need for post mold air cooling. The present disclosure advantageously eliminates any need for "footed" base designs having standing feet that are visible from the exterior of the container, which provides the benefit of increased design freedom and improved aesthetics.

The present disclosure advantageously provides for a 15% improvement under pasteurization and carbonated applications, such as with respect to base sag as compared to a base without the recesses.

The present disclosure also enables the deep inset recess to be used as locating, spotting, or gripping features during transport of the container on a filling and capping conveyor line and during the application of a label. The present disclosure also allows for external accessories, such as toys or other useful items to be retained by the deep inset recess features.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A polymeric container comprising:
a finish defining an opening of the container;
a body defining an internal volume for storing product therein; and
a base at an end of the body opposite to the finish, the base defining a plurality of recesses spaced apart from one another about an axial center of the base, each one of the recesses including a sidewall and an innermost end surface that is angled in cross-section such that the plurality of recesses are deepest proximate to the axial center of the base,
wherein:
at the plurality of recesses the base is thinner than between the plurality of recesses, and
at the plurality of recesses the base has higher crystallinity than between the plurality of recesses.

2. The polymeric container of claim 1, wherein the plurality of recesses are spaced apart equidistantly about the axial center of the base.

3. The polymeric container of claim 1, wherein the plurality of recesses are spaced apart randomly about the axial center of the base.

4. The polymeric container of claim 1, wherein the plurality of recesses are between a standing ring of the base configured to support the container upright and an axial center of the base.

5. The polymeric container of claim 1, wherein the plurality of recesses are round.

6. The polymeric container of claim 1, wherein the plurality of recesses are oval.

7. The polymeric container of claim 1, wherein the plurality of recesses are square.

8. The polymeric container of claim 1, wherein the plurality of recesses are triangular.

9. The polymeric container of claim 1, wherein the plurality of recesses are star-shaped.

10. The polymeric container of claim 1, wherein the plurality of recesses consist of intermixed shapes.

11. The polymeric container of claim 1, wherein the plurality of recesses consist of different sizes and depths.

12. The polymeric container of claim 1, wherein the plurality of recesses are arranged in an outer group and an inner group, each one of the plurality of recesses in the outer group is further from the axial center than each one of the plurality of recesses in the inner group.

13. The polymeric container of claim 1, wherein at the plurality of recesses the base has a thickness of about 0.25 mm-0.50 mm, and between the plurality of recesses the base has a thickness of about 0.60 mm-1.15 mm.

14. The polymeric container of claim 1, wherein the plurality of recesses have a depth that is greater than a width.

* * * * *